United States Patent
Nakao

(10) Patent No.: US 9,801,068 B2
(45) Date of Patent: Oct. 24, 2017

(54) TERMINAL DEVICE

(71) Applicant: KYOCERA Corporation, Kyoto-shi, Kyoto (JP)

(72) Inventor: Masayoshi Nakao, Ashiya (JP)

(73) Assignee: KYOCERA Corporation, Kyoto (JP)

( * ) Notice: Subject to any disclaimer, the term of this patent is extended or adjusted under 35 U.S.C. 154(b) by 26 days.

(21) Appl. No.: 14/671,736

(22) Filed: Mar. 27, 2015

(65) Prior Publication Data

US 2015/0208244 A1    Jul. 23, 2015

Related U.S. Application Data

(63) Continuation of application No. PCT/JP2013/076017, filed on Sep. 26, 2013.

(30) Foreign Application Priority Data

Sep. 27, 2012    (JP) ................................ 2012-214573

(51) Int. Cl.
| | | |
|---|---|---|
| G06K 9/78 | (2006.01) | |
| H04W 12/08 | (2009.01) | |
| G07C 9/00 | (2006.01) | |
| G06F 21/32 | (2013.01) | |
| G06F 3/01 | (2006.01) | |
| G06F 3/0484 | (2013.01) | |
| H04L 29/08 | (2006.01) | |
| G06K 9/00 | (2006.01) | |
| G06K 9/20 | (2006.01) | |

(52) U.S. Cl.
CPC ............ *H04W 12/08* (2013.01); *G06F 3/013* (2013.01); *G06F 3/04842* (2013.01);
(Continued)

(58) Field of Classification Search
CPC . G06F 3/013; G06F 3/04842; G06K 9/00221; G06K 9/00228; G06K 9/00288;
(Continued)

(56) References Cited

U.S. PATENT DOCUMENTS 5,506,717 A * 4/1996 Kho ...................... H04B 1/202
                                                  340/539.21
6,351,273 B1 * 2/2002 Lemelson ............. G06F 3/0485
                                                  704/271
(Continued)

FOREIGN PATENT DOCUMENTS

JP      H10-260773 A    9/1998
JP      2004-265353 A   9/2004
(Continued)

OTHER PUBLICATIONS

International Search Report dated Dec. 17, 2013, issued for International Application No. PCT/JP2013-076017.
(Continued)

*Primary Examiner* — Michael J Eurice
(74) *Attorney, Agent, or Firm* — Procopio Cory Hargreaves and Savitch LLP

(57) ABSTRACT

An image processing module can compare a face image of a user with a registered image which is a face image of a normal user, and detect a line of sight from the face image of the user. When the comparison between the face image of the user and the registered image matches at a part other than a line of sight, a control module can determine that an authentication of a user is successful, and start an application corresponding to a direction of the line of sight of the user or display a pre-set screen on a display.

8 Claims, 6 Drawing Sheets

(52) U.S. Cl.
CPC ......... *G06F 21/32* (2013.01); *G06K 9/00255* (2013.01); *G06K 9/00288* (2013.01); *G06K 9/00604* (2013.01); *G07C 9/00158* (2013.01); *H04L 67/125* (2013.01); *G06K 9/00221* (2013.01); *G06K 9/00228* (2013.01); *G06K 9/00281* (2013.01); *G06K 9/2081* (2013.01)

(58) Field of Classification Search
CPC ........... G06K 9/00604; G06K 9/00281; G06K 9/2081; G07C 9/00158
See application file for complete search history.

(56) References Cited

U.S. PATENT DOCUMENTS

| | | | | |
|---|---|---|---|---|
| 6,545,669 B1* | 4/2003 | Kinawi | ................ | G06F 3/0486 345/1.1 |
| 8,230,075 B1* | 7/2012 | Weskamp | ............ | H04W 4/023 709/203 |
| 8,312,660 B1* | 11/2012 | Fujisaki | ................ | F41A 17/08 42/70.01 |
| 8,639,214 B1* | 1/2014 | Fujisaki | ................ | G06Q 20/32 379/88.03 |
| 8,676,273 B1* | 3/2014 | Fujisaki | ............. | H04M 1/6505 379/142.06 |
| 8,872,910 B1* | 10/2014 | Vaziri | .................... | G02C 11/10 348/77 |
| 8,913,004 B1* | 12/2014 | Bozarth | ............ | G06K 9/00604 345/156 |
| 8,990,682 B1* | 3/2015 | Wong | .................... | G02B 27/017 715/254 |
| 2002/0105482 A1* | 8/2002 | Lemelson | ............. | G06F 3/0485 345/7 |
| 2003/0020707 A1* | 1/2003 | Kangas | .................. | G06F 3/011 345/418 |
| 2003/0059124 A1* | 3/2003 | Center, Jr. | ......... | G06K 9/00234 382/278 |
| 2005/0041867 A1* | 2/2005 | Loy | .................... | G06K 9/00221 382/190 |
| 2005/0175218 A1* | 8/2005 | Vertegaal | ............... | A61B 3/113 382/103 |
| 2006/0110008 A1* | 5/2006 | Vertegaal | .......... | G06K 9/00604 382/103 |
| 2006/0119572 A1* | 6/2006 | Lanier | ................... | G06F 1/1601 345/156 |
| 2006/0209013 A1* | 9/2006 | Fengels | ................ | G06F 3/0325 345/156 |
| 2006/0262140 A1* | 11/2006 | Kujawa | ................ | G06T 19/006 345/633 |
| 2007/0071288 A1* | 3/2007 | Wu | .................... | G06K 9/00281 382/118 |
| 2007/0154095 A1* | 7/2007 | Cao | .................... | G06K 9/00234 382/190 |
| 2007/0154096 A1* | 7/2007 | Cao | .................... | G06K 9/00234 382/190 |
| 2007/0164988 A1* | 7/2007 | Ryu | ........................ | G06F 3/013 345/156 |
| 2008/0192027 A1* | 8/2008 | Morrison | ............... | G06Q 30/02 345/177 |
| 2009/0110248 A1* | 4/2009 | Masuda | ................. | G06F 21/32 382/118 |
| 2009/0258667 A1* | 10/2009 | Suzuki | ..................... | B66B 1/46 455/550.1 |
| 2010/0134340 A1* | 6/2010 | Sotomaru | ............ | G08C 17/02 341/176 |
| 2010/0144436 A1* | 6/2010 | Marks | .................... | G06F 3/017 463/36 |
| 2010/0146461 A1* | 6/2010 | Ryu | ........................ | G06F 3/013 715/863 |
| 2010/0165382 A1* | 7/2010 | Asano | ................ | G06K 9/00228 358/1.15 |
| 2010/0177929 A1* | 7/2010 | Kurtz | ................. | G06K 9/00228 382/103 |
| 2010/0287500 A1* | 11/2010 | Whitlow | ................ | G02B 27/01 715/810 |
| 2011/0084893 A1* | 4/2011 | Lee | ........................ | G06F 1/1649 345/6 |
| 2011/0138317 A1* | 6/2011 | Kang | ...................... | G06F 3/011 715/780 |
| 2011/0138416 A1* | 6/2011 | Kang | ...................... | G06F 3/0482 725/39 |
| 2011/0150334 A1* | 6/2011 | Du | ..................... | G06K 9/00604 382/173 |
| 2011/0260965 A1* | 10/2011 | Kim | ........................ | G06F 3/013 345/156 |
| 2012/0038668 A1* | 2/2012 | Kim | ........................ | G06F 3/011 345/633 |
| 2012/0038669 A1* | 2/2012 | Lee | ........................ | G06F 3/011 345/633 |
| 2012/0050324 A1* | 3/2012 | Jeong | ..................... | G06F 17/30 345/633 |
| 2012/0069050 A1* | 3/2012 | Park | .................... | G06F 3/04883 345/632 |
| 2012/0072873 A1* | 3/2012 | Park | ........................ | G06F 3/013 715/863 |
| 2012/0075343 A1* | 3/2012 | Chen | ...................... | G09G 5/397 345/633 |
| 2012/0089273 A1* | 4/2012 | Seder | ..................... | B60Q 1/268 701/2 |
| 2012/0105447 A1* | 5/2012 | Kim | ................. | H04N 21/42226 345/419 |
| 2012/0113140 A1* | 5/2012 | Hilliges | .................. | G06F 3/012 345/633 |
| 2012/0122529 A1* | 5/2012 | Lyons | ..................... | G07F 17/3241 463/1 |
| 2012/0154751 A1* | 6/2012 | Pelah | .................... | A61B 3/0041 351/224 |
| 2012/0256886 A1* | 10/2012 | Ryu | ...................... | G06F 1/1632 345/204 |
| 2013/0044912 A1* | 2/2013 | Kulkarni | ............ | G06K 9/00671 382/103 |
| 2013/0141461 A1* | 6/2013 | Salter | .................... | G06T 7/0044 345/633 |
| 2013/0223673 A1* | 8/2013 | Davis | ........................ | G06K 9/78 382/100 |
| 2013/0293530 A1* | 11/2013 | Perez | ................ | G06K 9/00671 345/418 |
| 2014/0104316 A1* | 4/2014 | Sharma | ................ | G06F 1/1626 345/633 |
| 2014/0157210 A1* | 6/2014 | Katz | ...................... | G06F 3/017 715/863 |
| 2014/0313230 A1* | 10/2014 | Suggs | ...................... | G06T 3/00 345/648 |
| 2014/0337016 A1* | 11/2014 | Herbig | ................ | G10L 25/27 704/201 |
| 2015/0035746 A1* | 2/2015 | Cockburn | ............... | G06F 3/013 345/156 |

FOREIGN PATENT DOCUMENTS

| | | |
|---|---|---|
| JP | 2007-156768 A | 6/2007 |
| JP | 4057501 B2 | 3/2008 |
| JP | 2010-257060 A | 11/2010 |
| WO | 2007-119818 A1 | 10/2007 |

OTHER PUBLICATIONS

Written Opinion of the International Searching Authority issued by Japan Patent Office for International Application No. PCT/JP2013/076017.

\* cited by examiner

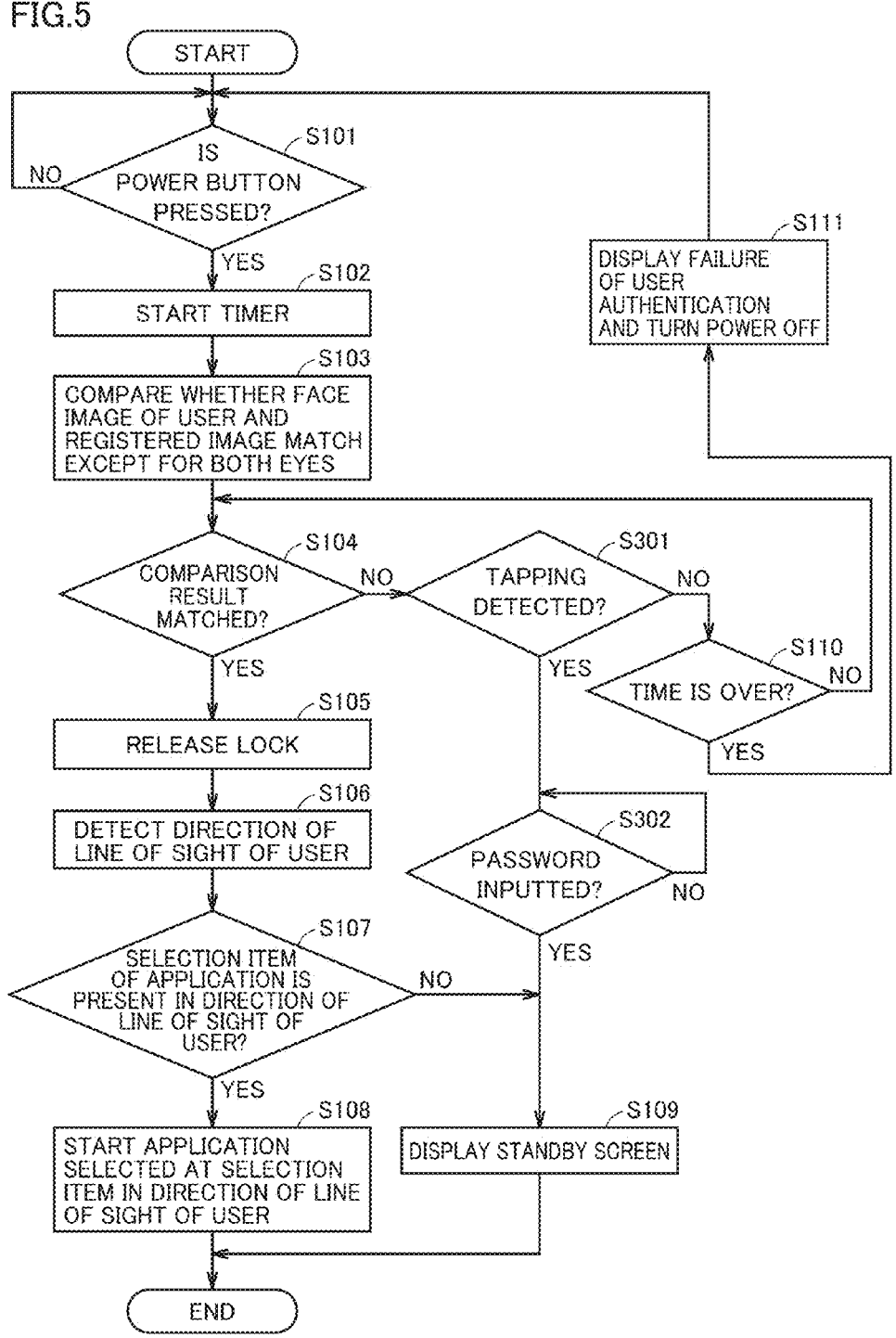

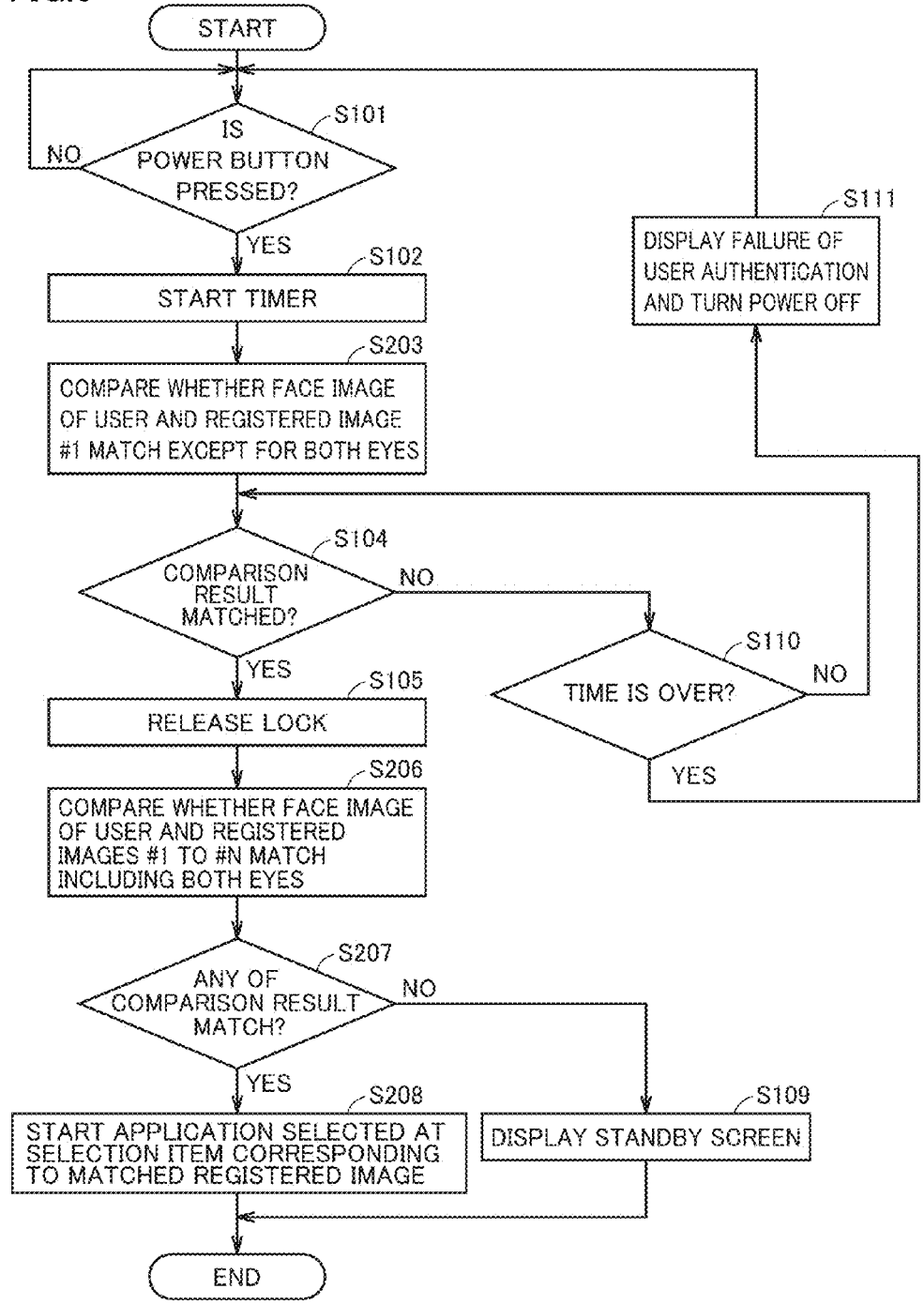

TERMINAL DEVICE

CROSS-REFERENCE TO RELATED APPLICATION

The present application is a bypass continuation of international application PCT Application No. PCT/JP2013/076017 filed on Sep. 26, 2013, entitled "TERMINAL DEVICE", which claims the benefit of Japanese Application No. 2012-214573, filed on Sep. 27, 2012, entitled "TERMINAL DEVICE". The disclosure of the above applications are each incorporated herein by reference.

FIELD

An embodiment of the present disclosure relates to a terminal device. For example, it relates to a mobile-type terminal device such as a mobile phone.

BACKGROUND

Conventionally, there has been known a device configured to release a lock by means of a face recognition.

For example, in one authentication system, a mobile phone includes a storage unit configured to store in advance authentication information related to a face image of a user, a housing state monitoring unit configured to detect a predetermined state of the mobile phone, an application monitoring unit, and an acquiring unit configured to acquire a face image of a user, without notifying a user, by using a detection of the predetermined state as a trigger. This mobile phone further includes a determination unit configured to compare an obtained face image and the authentication information stored in the storage unit and determine whether or not the face image and the authentication information match, and a function control unit configured to release a lock of a predetermined application prior to the determination performed by the determination unit, maintain the released state when determined that the face image and the authentication information match, and otherwise lock a predetermined function.

SUMMARY

A terminal device in one embodiment includes a display, an image processing unit configured to compare a face image of a user and a registered image, which is a face image of a normal user, and detect a line of sight of the user from the face image of the user, and a control unit configured to, when the comparison between the face image of the user and the registered image matches except for the line of sight, determine that an authentication of the user is successful, and start an application corresponding to a direction of the line of sight of the user, or display a pre-set screen on the display.

BRIEF DESCRIPTION OF DRAWINGS

FIG. 5 is a flowchart representing a procedure of a lock-releasing and application-starting operation performed by a terminal device of a modified example of the first embodiment.

FIG. 6 is a flowchart representing a procedure of a lock-releasing and application-starting operation performed by a terminal device of the second embodiment.

DETAILED DESCRIPTION

In the following paragraphs, embodiments will be described with reference to the drawings.

When a user of a terminal device would like to start an E-mail application or a browser application after releasing a lock, an operation such as selecting an application through a touch panel was required. Therefore, the user could not operate a desired application immediately after the release of the lock. Hence, the terminal device is required which is capable of starting an application desired by the user without having the user to perform a cumbersome operation after releasing a lock by means of a face recognition.

First Embodiment

Figure 1:
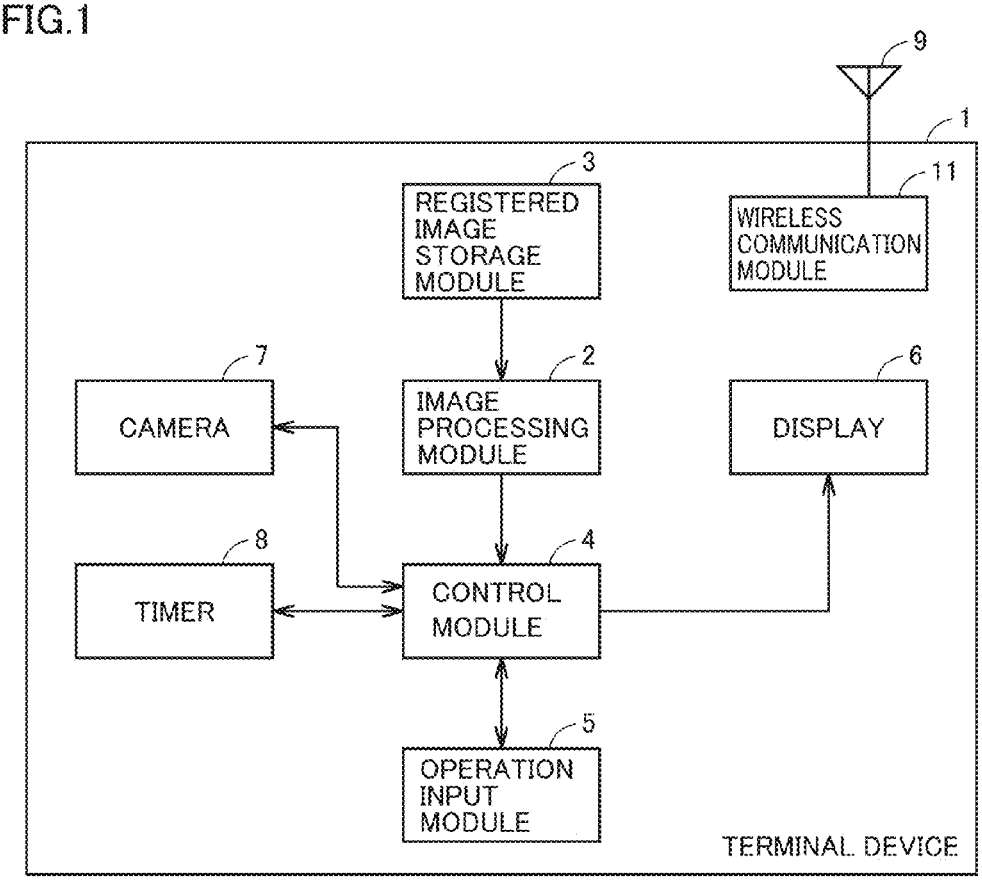
FIG. 1 represents a configuration of a terminal device of an embodiment.

FIG. 1 represents a configuration of a terminal device of the embodiment.

Referring to FIG. 1, this terminal device 1 is a mobile-type terminal device such as a mobile phone. Terminal device 1 includes an antenna 9, a wireless communication module 11, a camera 7, an operation input module 5, a registered image storage module 3, an image processing module 2, a control module 4, a display 6, and a timer 8.

Wireless communication module 11 can transmit and receive data, control signals, and the like to and from a wireless base station through antenna 9.

Camera 7 can capture a face image of a user.

Operation input module 5 can be constituted of a touch panel and receives an operation input from a user.

Display 6 can be a liquid crystal display and can display one or more selection items for selection of an application.

Registered image storage module 3 can store a registered image which is a face image of a normal user.

Timer 8 can provided to manage whether an authentication of a user is successfully performed within a limited time period.

Image processing module 2 can compare a face image of a user captured by camera 7 and a registered image stored in registered image storage module 3 at parts except for both eyes representing a line of sight.

Figure 2:
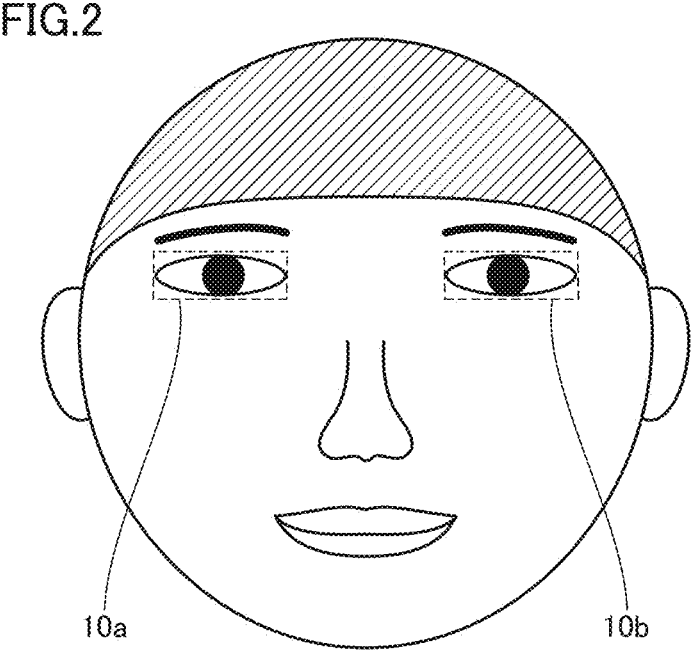
FIG. 2 represents an example of a face image of a user.

FIG. 2 represents an example of a face image of a user. In the face image of a user, since both eye regions 10a, 10b include pupils representing a line of sight and regions receiving a reflected light, the comparison can be made whether or not the parts except for the both eye regions match with the registered image.

When the comparison matches, image processing module 2 can detect a line of sight of the user from the face image of the user.

When the comparison between the face image of the user and the registered image matches at parts except for both eyes representing the line of sight, control module 4 can determine that an authentication of the user is successful, and can release a locked state in which a reception of an operation input of a user from operation input module 5 is rejected.

When the authentication of a user is successful, control module 4 can start an application corresponding to a direction of a detected line of sight of the user, or can display a pre-set screen on display 6. More specifically, control module 4 can start an application corresponding to the selection item displayed in the direction of the detected line of sight of the user. When no selection item is present in the direction of the detected line of sight of the user, control module 4 can display a pre-set screen (for example, a standby screen) on display 6.

Figure 3:
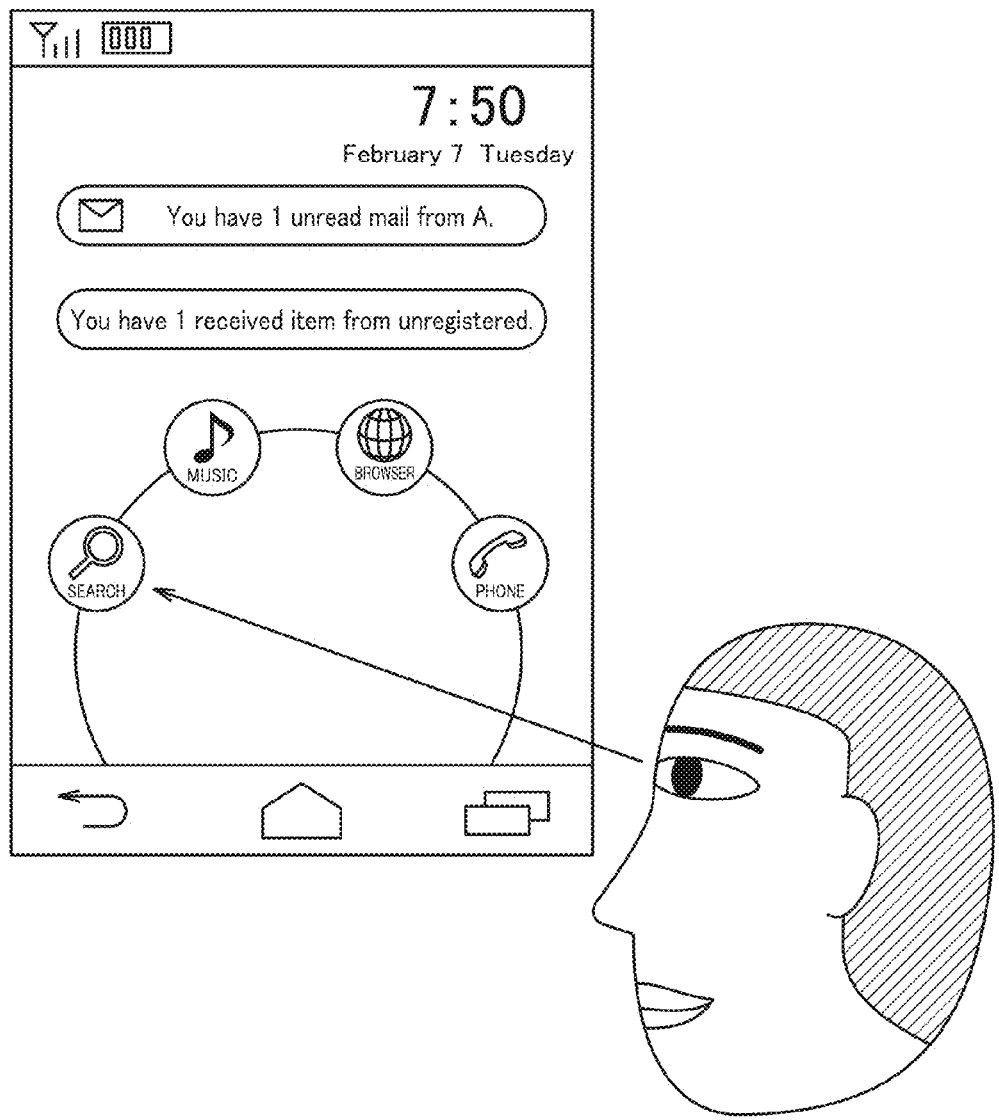
FIG. 3 represents an example of starting of an application by means of a line of sight of a user.

FIG. 3 represents an example of an example of starting of an application by means of a line of sight of a user.

After a successful authentication of a user, since a selection item of an application for conducting a search is displayed in the direction of the line of sight of the user, a search can be conducted.

Figure 4:
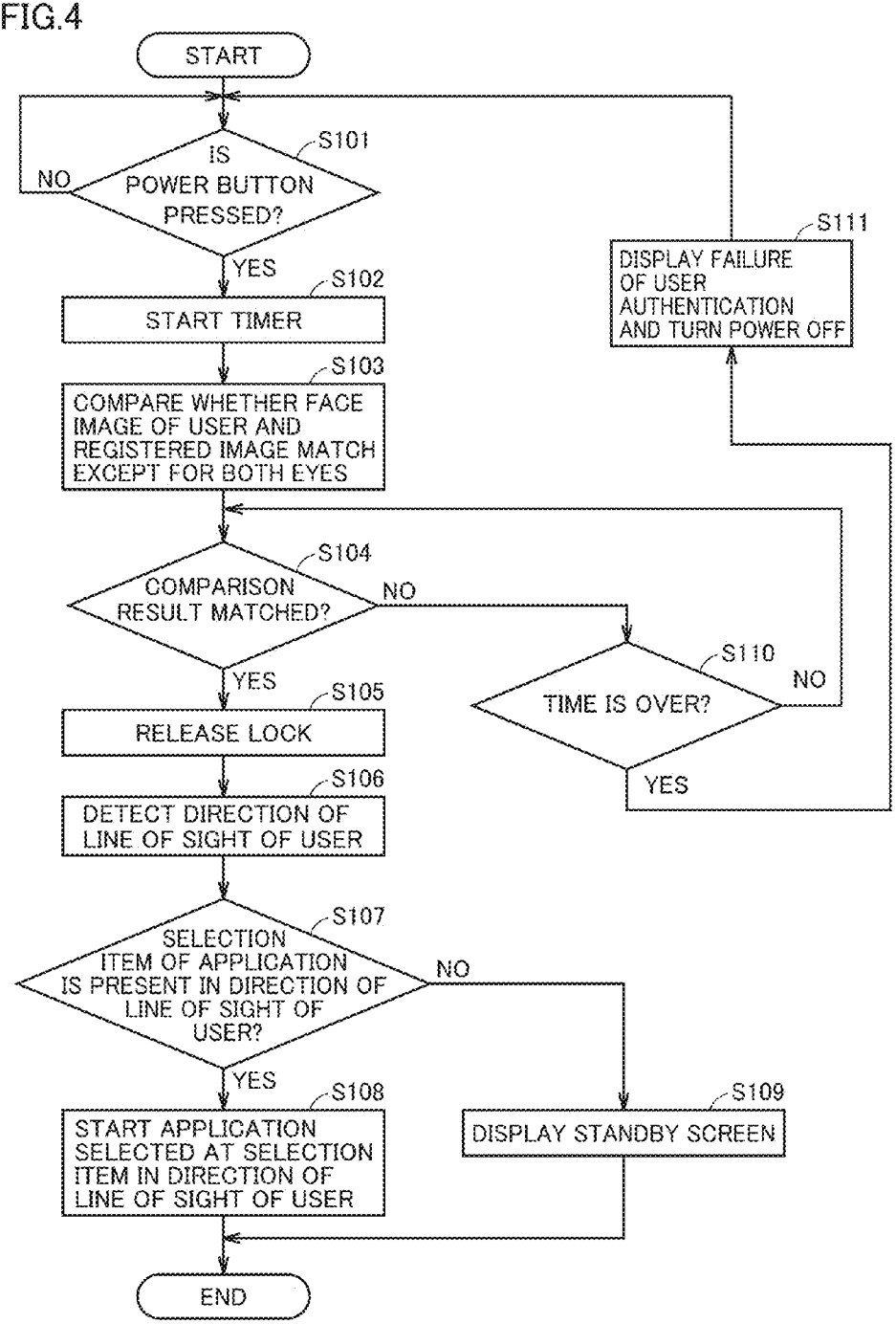
FIG. 4 is a flowchart representing a procedure of a lock-releasing and application-starting operation performed by a terminal device of a first embodiment.

FIG. 4 is a flowchart representing a procedure of a lock-releasing and application-starting operation performed by the terminal device of the first embodiment.

Referring to FIG. 4, when a user presses down a power button (YES in step S101), control module 4 can start timer 8 (step S102). The pressing down of the power button can be used as a trigger because it is assumed that a user firstly turns on display 6, which is in the off-state, when the user would use the terminal device. Therefore, depending on a terminal device, timer 8 may be started with pressing down of other hard key, not limited to the power button, as a trigger. Moreover, display 6 may be turned on and timer 8 may be started with an event or an interruption processing, such as an alarm or an incoming call, as a trigger. In that case, timer 8 may be configured so as not to be over a time limit until the event or interruption processing is completed.

Image processing module 2 can compare whether or not a face image of a user captured by camera 7 and a registered image stored in registered image storage module 3 (in other words, a face image of a normal user) match at parts except for both eyes representing a line of sight (step S103).

When the comparison result matches (YES in step S104), control module 4 can determine that the user authentication is successful, and can release a lock which rejects reception of an operation input of a user (step S105).

Further, image processing module 2 can detect a direction of a line of sight of a user from a face image of the user captured by camera 7 (step S106).

When a selection item of an application displayed on display 6 is present in the direction of the line of sight of the user (YES in step S107), control module 4 can start the application corresponding to the selection item which is present in the direction of the line of sight of the user (step S108).

When a selection item of an application displayed on display 6 is not present in the direction of the line of sight of the user (NO in step S107), control module 4 can display a standby screen (step S109).

On the other hand, after timer 8 is started (step S102), when the comparison result does not match (NO in step S104), and a time limit of timer 8 is over (YES in step S110), control module 4 can display a failure of the user authentication on display 6, and can turn off the power (step S111). It is not all necessary to display the failure of the user authentication.

As described above, according to the present embodiment, after a lock is released by means of a face recognition, an application displayed in a direction of a line of sight of a user can be started. Therefore, an application desired by a user can be started without having the user to perform a cumbersome operation.

In the procedure of the lock-releasing and application-starting operation shown in the flowchart of FIG. 4, when the comparison result matches in step S104, control module 4 can determine that the user authentication is successful, and then can release the lock which rejects reception of an operation input of a user (step S105). In place of this, when the comparison result matches in step S104, control module 4 may detect a direction of a line of sight of a user (step S106), and thereafter release a lock based on the comparison result.

In other words, when a direction of a line of sight of a user is detected, and a selection item of an application displayed on display 6 is present in the direction of the line of sight of the user, control module 4 may release a lock and start an application corresponding to the selection item present in the direction of the line of sight of the user. On the other hand, when a selection item of an application displayed on display 6 is not present in a direction of a line of sight of a user, control module 4 may release a lock and display a standby screen.

Moreover, in the flowchart of FIG. 4, after timer 8 is started (step S102), when the comparison result does not match (NO in step S104), and a time limit is over at timer 8 (YES in step S110), control module 4 can turn off the power (step S111). However, for example, in preparation for the case where the face recognition cannot be done well due to a glass on a user or an injury on a users face, the lock may be released in another way by users setting. The another method is, for example, a method in which control module 4 can request a user to enter a password on a password input screen displayed in accordance with tapping on a screen by a user.

FIG. 5 is a flowchart representing a procedure of the lock-releasing and application-starting operation performed by the terminal device of the first embodiment, taking into account the another method described above.

As shown in FIG. 5, when the comparison result does not match (NO in step S104), control module 4 can detect whether or not the screen is tapped. When the screen is tapped (YES in step S301), control module 4 can display on display 6 an input box for inputting a password. When the password is inputted to the input box (YES in step S302), control module 4 can release a lock and display a standby screen.

When the screen is not tapped (NO in step S301), and a time limit is over at timer 8 (YES in step S110), control module 4 can display on display 6 a failure of the user authentication, and turn the power off (step S111).

In the example shown in FIG. 5, the operation of displaying a screen for inputting a password can be performed by the tapping operation. However, the operation is not limited to the tapping operation, and it may be other operation such as a flick operation or a double-tapping operation. Moreover, when a user applies the setting of allowing releasing of a lock not only by the face authentication but also by an input of a password, it may be set so that the time management is not performed by timer 8.

Second Embodiment

In the second embodiment, registered images can be prepared respectively for lines of sight of a normal user, and an authentication of a user and a detection of a line of sight can be performed by comparing these registered images with a captured face image of a user.

Registered image storage module 3 can store a plurality of registered images. Each registered image can be a face image of a normal user which is captured when a user directs a line of sight to a corresponding selection item.

Image processing module 2 can compare a face image of a user captured by camera 7 and a plurality of registered images.

When a comparison between a face image of a user and one specific registered image or any registered image matches at parts except for both eyes, control module 4 can determine that an authentication of a user is successful, and release the locked state in which reception of an operation input of a user from operation input module 5 is rejected.

When the authentication of the user is successful, and a comparison between a face image of a user and the registered image including both eyes matches, control module 4 can start an application corresponding to a selection item corresponding to the registered image. When an authentication of a user is successful, and a registered image matching with a face image of a user including both eyes in the comparison is not present in registered image storage module 3, control module 4 can display a pre-set screen (for example, standby screen) on display 6.

FIG. 6 is a flowchart representing a procedure of the lock-releasing and application-starting operation performed by the terminal device of the second embodiment.

Referring to FIG. 6, when a user presses down a power button (YES in step S101), control module 4 can start timer 8 (step S102).

Image processing module 2 can compare whether or not a face image of a user captured by camera 7 and a registered image #1 stored in registered image storage module 3 (in other words, one of the plurality of faces images of a normal user) match at parts except for both eyes representing a line of sight (step S203).

When the comparison result matches (YES in step S104), control module 4 can determine that the user authentication is successful, and release a lock which rejects reception of an operation input of a user (step S105).

Further, image processing module 2 can compare whether or not the face image of the user captured by camera 7 matches with any one of the registered images #1 to #N stored in registered image storage module 3, including both eyes (step S206).

When the face image of the user matches with any of the registered images #1 to #N (YES in step S207), control module 4 can start an application corresponding to a selection item corresponding to the matched registered image (step S208).

When the face image of the user does not match with any of the registered images #1 to #N (NO in step S207), control module 4 can display a standby screen (step S109).

On the other hand, after timer 8 is started (step S102), when the comparison result does not match (NO in step S104), and a time limit is over at timer 8 (YES in step S110), control module 4 can display on display 6 a failure of the user authentication, and turn the power off (step S111).

As described above, according to the present embodiment, similarly to the first embodiment, after the lock is released by means of the face recognition, an application displayed in a direction of a line of sight of a user can be started. Therefore, an application desired by a user can be started without having the user perform a cumbersome operation.

In the procedure of the lock-releasing and application-starting operation shown in the flowchart of FIG. 6, when the comparison result matches in step S104, control module 4 can determine that the user authentication is successful, and release the lock which rejects reception of the operation input of the user (step S105). In place of this, when the comparison result matches in step S104, control module 4 may compare whether or not a face image of a user captured by camera 7 matches with any of the registered images #1 to #N stored in registered image storage module 3, including both eyes (step S206), and thereafter release the lock based on the comparison result.

Moreover, according to the present embodiment, image processing module 2 can compare whether or not a face image of a user captured by camera 7 matches with a registered image #1 stored in registered image storage module 3 (in other words, any one of the plurality of face images of a normal user) at parts except for both eyes representing a line of sight (step S104), and thereafter can compare whether or not the face image of the user captured by camera 7 matches with any of the registered images #1 to #N stored in registered image storage module 3 (step S206). In place of this, image processing module 2 may compare at once whether or not the face image of the user captured by camera 7 matches with any of registered images #1 to #N stored in registered image storage module 3, including both eyes, and control module 4 may release a lock, and start an application or display a standby screen.

Modified Example

The present disclosure is not limited to the embodiments described above. For example, the following modified examples may be included.

(1) Standby Screen

In the embodiments, when no selection item of an application is present in a direction of a line of sight, a standby screen can be displayed. However, the present disclosure is not limited to it. For example, when a selection item of an application is not present in a direction of a line of sight of a user, and the direction of the line of sight of the user is at a center of the display screen, the standby screen may be displayed.

(2) Terminal Device

The present disclosure is applied not only to the mobile-type terminal device. For example, it can also be applied to the user authentication by facing a face to a terminal device arranged on a side of a door, or a selection of an application for turning on an air conditioner or a light by a line of sight or turning on a power of a personal computer. Moreover, other than the applications, any functions such as turning on a light of an LED or turning on a security buzzer, other than the applications can be started.

The disclosed embodiments are by way of illustration in all aspects and should not be taken by limitation. The scope of the present disclosure is indicated by the appended claims rather than the description above, and inclusion of the meaning equivalent to the appended claims and all of the modification within the scope of claims are intended.

The invention claimed is:

1. A terminal device comprising:
a display;
a memory that stores one or more registered face images; and
at least one processor configured to
determine whether or not a face image of a user, acquired by a camera, matches at least one of the one or more registered face images, wherein the acquired face image is determined to match the at least one registered face image even when eyes in the acquired face image do not match eyes in the at least one registered face image,
detect a line of sight of the user from the acquired face image, and, when the acquired face image is determined to match the at least one registered face image,
  determine that an authentication of the user is successful, and
  when the acquired face image matches the at least one registered face image, except in the eyes, release a locked state in which inputs of a user are rejected, and,
  when the acquired face image matches the at least one registered face image, including in the eyes, start an application corresponding to a direction of the line of sight of the user, or display a pre-set screen on the display.

2. The terminal device according to claim 1, wherein the display is configured to display at least one application icon, and wherein starting an application corresponding to the direction of the line of sight of the user comprises starting an application associated with an application icon at a position on the display corresponding to the direction of the line of sight.

3. The terminal device according to claim 2, wherein the display is configured to display a plurality of application icons, wherein the memory stores a plurality of registered face images, and wherein each of the plurality of registered face images represents a face of a user who has directed a line of sight to a corresponding one of the plurality of application icons.

4. The terminal device according to claim 2, wherein, the at least one processor, when no application icon is present at the position corresponding to the direction of the line of sight of the user, displays the pre-set screen on the display.

5. The terminal device according to claim 4, wherein the pre-set screen includes a standby screen.

6. A terminal device comprising:
  a display; and
  a memory that stores a registered face image;
  at least one processor configured to
    determine whether or not a face image of a user, acquired by a camera, matches the registered face image, wherein the acquired face image is determined to match the registered face image even when eyes in the acquired face image do not match eyes in the registered face image,
    detect a line of sight of the user from the acquired face image, and,
    when the acquired face image is determined to match the registered face image,
      determine that an authentication of the user is successful, and
      start an application corresponding to a direction of the line of sight of the user, or display a pre-set screen on the display,
  wherein the at least one processor is configured to, when the acquired face image is determined to match the registered face image and authentication of the user is determined to be successful, release a locked state in which inputs of a user are rejected,
  wherein the display is configured to display at least one application icon, and wherein starting an application corresponding to the direction of the line of sight of the user comprises starting an application associated with an application icon at a position on the display corresponding to the direction of the line of sight,
  wherein the display is configured to display a plurality of application icons, wherein the memory stores a plurality of registered face images, wherein each of the plurality of registered face images represents a face of a user who has directed a line of sight to a corresponding one of the plurality of application icons, and wherein the at least one processor is configured to, when the acquired face image and one of the plurality of registered face images matches, including the eyes of the acquired face image matching the eyes of the one registered face image, start an application associated with the one of the plurality of application icons corresponding to the one registered face image, and
  wherein the at least one processor is configured to
    when the acquired face image matches one of the plurality of registered face images, except in the eyes, release a locked state in which inputs of a user are rejected, and,
    when the acquired face image matches one of the plurality of registered face images, including in the eyes, start an application associated with the one of the plurality of application icons corresponding to the one registered face image.

7. The terminal device according to claim 6, wherein, the at least one processor, when no application icon is present at the position corresponding to the direction of the line of sight of the user, displays the pre-set screen on the display.

8. The terminal device according to claim 7, wherein the pre-set screen includes a standby screen.

* * * * *